United States Patent [19]
Toth

[11] 3,813,594
[45] May 28, 1974

[54] MAGNETICALLY CONTROLLED POWER SUPPLY HAVING PULSATING OUTPUT CURRENT CONTROL

[75] Inventor: Tibor Endre Toth, Florence, S.C.

[73] Assignee: Union Carbide Corporation, New York, N.Y.

[22] Filed: Apr. 24, 1973

[21] Appl. No.: 353,964

[52] U.S. Cl. ............ 321/18, 219/131 WR, 321/25, 321/47
[51] Int. Cl. ............................................ H02m 7/20
[58] Field of Search ......... 219/131 WR; 321/18, 25, 321/47; 323/57

[56] References Cited
UNITED STATES PATENTS

| 3,299,341 | 1/1967 | Corey | 321/47 |
| 3,437,841 | 4/1969 | Siebers et al. | 321/18 |
| 3,439,253 | 4/1969 | Piteo | 321/47 X |
| 3,462,671 | 8/1969 | Lawn | 321/47 X |
| 3,758,840 | 9/1973 | Oliver | 321/47 X |

Primary Examiner—William M. Shoop, Jr.
Attorney, Agent, or Firm—Eugene Leiberstein

[57] ABSTRACT

A magnetically controlled arc working power supply having a current control circuit with means for automatically pulsing the control current to produce a pulsating DC output current at an adjustable rate within a frequency range of 1–20 cps.

5 Claims, 3 Drawing Figures

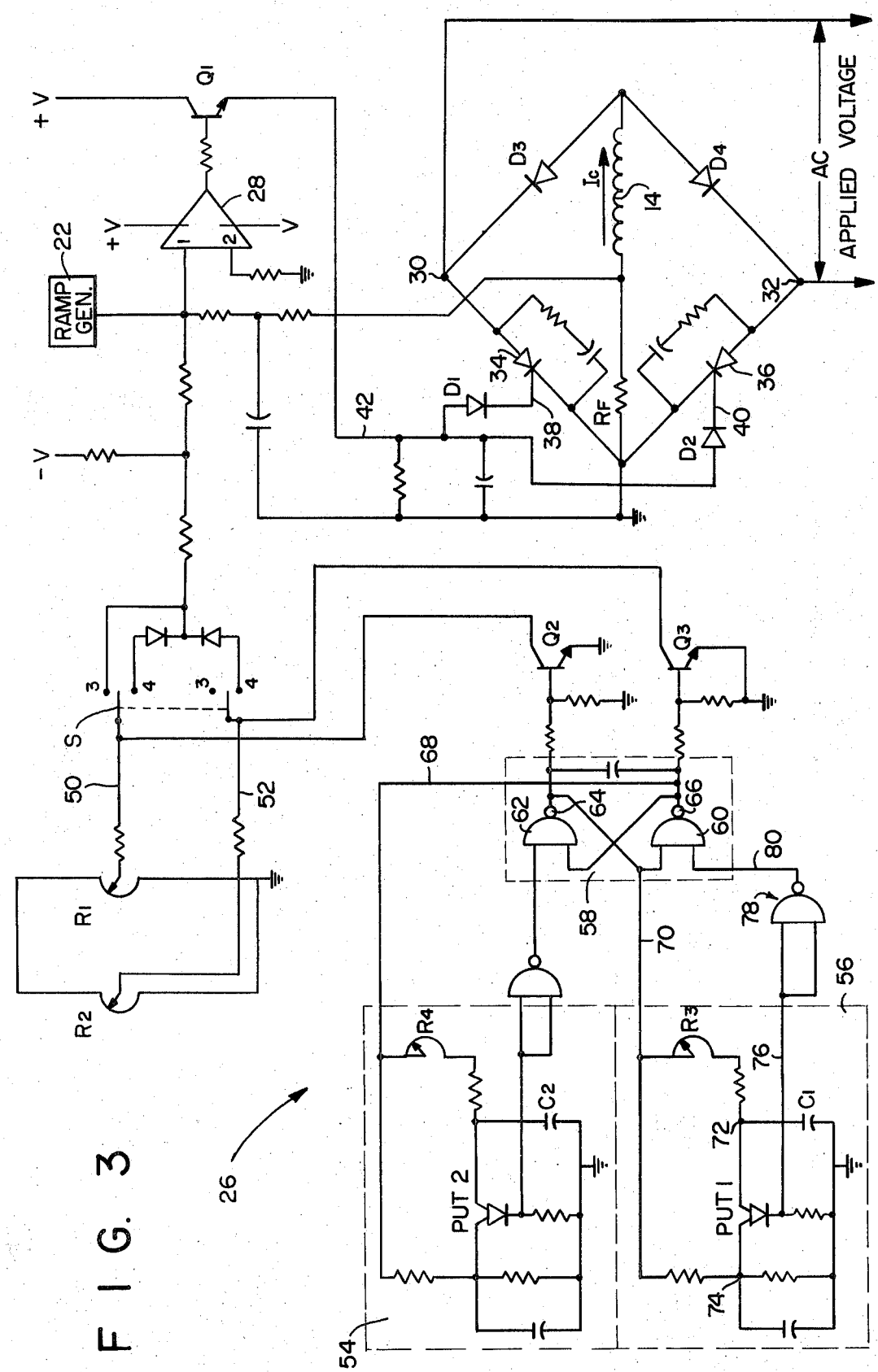
F I G. 3

MAGNETICALLY CONTROLLED POWER SUPPLY HAVING PULSATING OUTPUT CURRENT CONTROL

The present invention relates to arc working power supply apparatus employing a magnetic control element having a control winding for current control.

Many arc working applications require a power supply with a current control capability over an extended current range of operation, e.g., from only a few amperes to several hundred or more amperes and with a fair degree of precision. One power supply designed to provide such a wide operating current range with current control over the entire range is shown and described in U. S. Pat. application Ser. No. 281,347 filed on Aug. 17, 1972. The power supply, as taught therein employs a saturable reactor as the current control medium. The magnitude of the arc working current is determined by adjustment of the current in the saturable reactor control winding. The current is then held constant at any such preadjusted value by a current control circuit.

The present invention relates to an improvement in the above mentioned power supply for enabling the power supply to produce a pulsating DC output current at an adjustable rate within a predetermined frequency range. Such a pulsating output current has unique applicability in certain welding applications.

Although apparatus is presently available to provide a pulsating current of appropriate magnitude and with appropriate control over pulse height, width, background and transition times, the cost of such apparatus is either prohibitive or the "transition times" are much too long for some of the more critical applications. The phrase "transition times" covers the rise and fall response times between the pulsating output current levels.

Accordingly, it is the sole object of the present invention to provide a relatively low cost arc working power supply with a relatively low cost magnetically controlled pulsating output current control circuit which substantially reduces transition times and thereby allows for higher pulse rates than heretofore available.

Further objects and advantages of the present invention will become apparent from a reading of the following description when taken in connection with the accompanying drawings in which:

FIG. 3 is a partially schematic circuit diagram of the magnetic control element current control circuit of FIG. 1.

Figure 1:
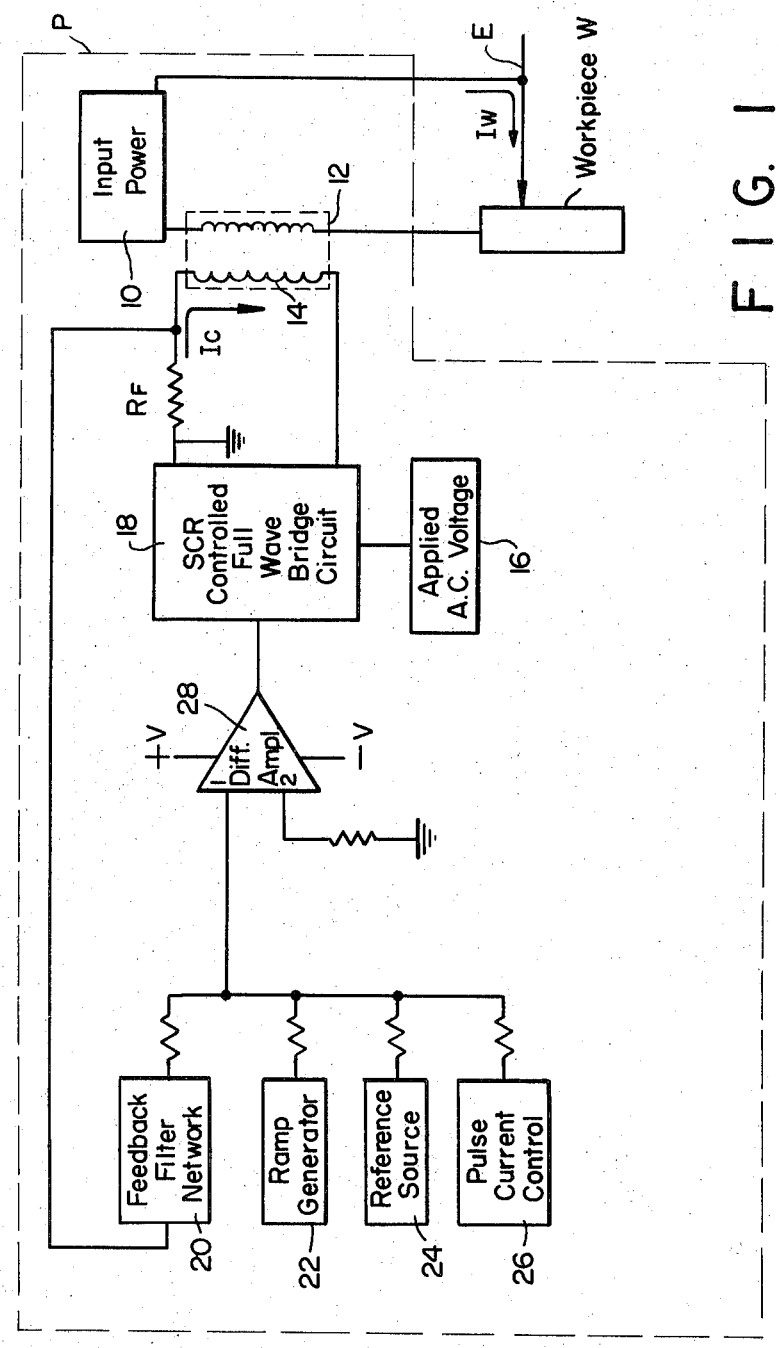
FIG. 1 is a block diagram of the arc working power supply of the present invention.

Referring now to FIG. 1 in which is shown the arc working power supply P of the present invention coupled electrically in series circuit relationship with a workpiece W and an electrode E. The power supply P includes in combination; an input power source 10, a magnetic control element 12 such as a saturable reactor having a control winding 14, and control circuitry for generating and controlling the control current $I_c$.

The control current $I_c$ is a DC current generated from an applied conventional 60 cycle AC sinusoidal voltage 16 which is rectified in the full wave bridge rectifier circuit 18. The full wave bridge rectifier circuit 18 is SCR phase controlled to govern and vary the magnitude of the control current $I_c$. Thus, conceptually, a change in the conduction angle of the full wave bridge SCR's will cause a change in the magnitude of the control current $I_c$, passing through the control winding 14, which will in turn cause a proportional change in the arc working current passing through the workpiece W.

The SCR conduction period for the full wave bridge circuit 18 is determined during each half cycle of the applied AC input voltage by the output polarity of difference amplifier 28. The difference amplifier 28 is a conventional operational amplifier which is employed as a comparator for comparing the signals applied between terminals (1) and (2) respectively. By effectively clamping terminal (2) of difference amplifier 28 to ground potential and applying all of the input signals to terminal (1) the output of difference amplifier 28 will either be positive at $+V$ or negative at $-V$ depending upon the instantaneous polarity of the composite of all of the input signals at terminal (1). A reversal from any one output polarity to the other may be used to initiate conduction of the SCR bridge rectifier circuit 18 during any half cycle, although for present purposes a reversal from negative to positive polarity is used to trigger the SCR's.

The signals applied to terminal (1) of difference amplifier 28 come from the following sources: feedback network 20, ramp generator 22, reference source 24 and pulse current control 26 respectively. The feedback network 20 provides an essentially DC output voltage which is proportional to the voltage taken across feedback resistor $R_F$ and which is therefore directly proportional to the magnitude of the control current $I_c$. The ramp generator 22 provides a conventional saw-tooth output voltage which linearly rises at a periodic rate in synchronism with each half cycle of the applied AC voltage. The reference source 24 provides a manually adjustable DC output voltage which may be calibrated to correspond to the desired range of arc working currents. The pulse current control 26 provides an output which modifies the combined output from the ramp generator 22 and the reference source 24 in a manner which will be explained hereafter. The output from reference source 24 merely shifts, upwardly or downwardly, the output of the ramp generator 22 to produce a reference signal, as will be hereinafter referred to, which rises linearly from a first DC level to a second DC level in synchronism with each half cycle of applied input voltage. This reference signal is compared against the output of the feedback filter network 20 by the difference amplifier 28.

Since the output of filter network 20 is essentially a DC voltage, the combined voltages at terminal (1) of the difference amplifier 28 is a saw-tooth wave form which varies from a negative to positive voltage during each half cycle of applied input voltage. The crossover instant of the time, from negative to positive voltage, during a given half cycle, marks the transition from one output polarity of difference amplifier 28 to the opposite output polarity and is thus indicative, for that half cycle, of the period of conduction for the bridge rectifier circuit 18.

Figure 2:
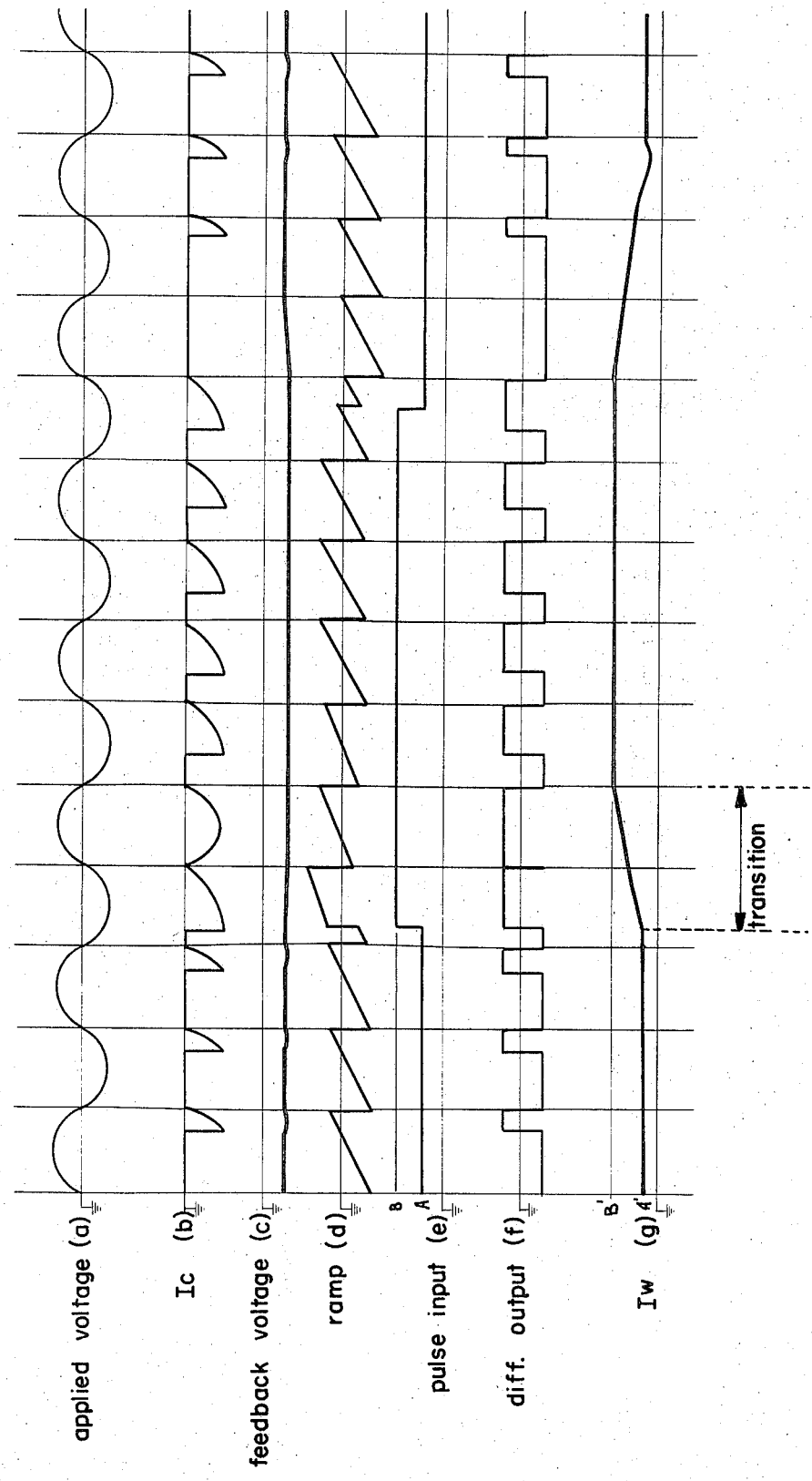
FIG. 2 ($a$–$g$) is a series of electrical wave forms teaching the concept underlying the present invention.

The waveforms of FIG. 2 readily illustrate the concept underlying the operation of the system of FIG. 1 including the specific improvement of the present invention. Waveform (a) is representative of the applied AC sinusoidal input voltage while waveform (b) is representative of the control current Ic. The feed-back voltage which is derived from the voltage across resistor $R_F$ and then filtered is shown in waveform (c). Waveform (d) is illustrative of the composite of the outputs applied to terminal (1) of the difference amplifier 28. At the instant of crossover, when the ramp intersects grounds potential, labeled Ti, the output of the difference amplifier 28 reverses from a negative to a positive polarity. This is shown in waveform (f). Hence, the location of the instant of time T$i$ during each half cycle controls the conduction period of the bridge rectifier network 18 for that half cycle. The ramp signal at terminal (1) after each crossover instant T$i$ and until the end of that half cycle does not remain as linear as waveform (d) indicates but is shown linear for clarity sake.

The pulse current control 26 of FIG. 1 provides an output, as shown by waveform (e), which varies between two DC levels and which is preferably not synchronized to the ramp signal. This lack of synchronization permits the use of very simple circuitry for achieving a pulsed welding current. As shown in waveform (e) the jump from level A to level B and vice versa may occur at any particular instant within a half cycle. Pulse output levels A and B correspond to their counterpart output welding current levels A' and B' respectively as indicated in waveform (g). The transition period is the adjustment time for the output welding current Iw to go from the level of A' to that of B' and vice versa. The effect of the jump in the pulse output from A to B and from B back to A on the composite ramp signal at terminal (1) is to shift the crossover instant T$i$ which in turn advances or delays the reversal in output polarity of difference amplifier 28. This will vary the conduction period of the bridge rectifier network 18 and will change the level of the control current Ic accordingly. The adjustment in control current Ic to each jump in pulse level is quite rapid as is shown in waveform (b). How quickly the welding current Iw follows the change in control current Ic depends upon the type of magnetic control element employed. For example, using a conventional magnetic amplifier, of the self saturating type, for the magnetic control element will permit the welding current to be pulsed within a range of between 1 to 20 cycle per second. Where, however, a saturable reactor is used for the magnetic control element 12 the welding current cannot respond as fast to changes in the control current Ic and the pulsing must be at a lower frequency rate of preferably below 10 cycles per second.

A complete description of the pulse current control circuit 26 will be elaborated upon hereafter in connection with the description of the circuit diagram of the system as shown in FIG. 3.

The control winding 14 of the magnetic control element 12 is shown connected in series circuit relationship with feedback resistor $R_F$ and the output of bridge network 18. The bridge network 18 has two parallel legs connected at opposite ends and which are identified as points 30 and 32 respectively and across which is imposed the AC applied voltage 16. A pair of silicon controlled rectifiers (SCR's) 34 and 36 respectively, make up one leg of the bridge network with their cathodes connected in common to ground. The control gates 38 and 40 of SCR's 34 and 36 respectively, are connected together through diodes $D_1$ and $D_2$ at the common junction 42. The output of difference amplifier 28 is connected through an emitter follower $Q_1$ to the common junction 42 for simultaneously providing a firing pulse to control gates 38 and 40 respectively upon each reversal in its output polarity to a positive +V potential. Hence, when point 30 is positive with respect to point 32, SCR 34 will energize as soon as control gate 38 receives a firing pulse. During this half cycle SCR 36 remains back biased and cannot energize. A path is thus established from point 30 through SCR 34 control winding 14 and diode $D_4$ to point 32. During the opposite half cycle of applied AC voltage as soon as control gate 40 of SCR 36 receives a firing pulse, a path will be established through SCR 36, control winding 14 and diode $D_3$ to point 30. SCR 34 during this half cycle is back biased and cannot energize.

As stated earlier terminal (1) of difference amplifier 28 has imposed thereon a signal which is a composite from a number of sources all of which supply at terminal (1) predetermined DC potentials the levels of which may periodically shift with the exception of the ramp generator 22 which supplies a conventionally derived saw-tooth signal waveform.

Provided switch S, a double pole double throw switch with its corresponding contact terminal positions labeled 3 and 4 respectively, is in position 3 a DC voltage related to the adjusted position of potentiometer R1 will be generated. The voltage generated from potentiometer R1 is representative of the output from reference source 24 in FIG. 1. With switch S in position 4 the output reference voltage alternately switched from potentiometer R1 to potentiometer Ra and back by the pulse current control circuitry 26 which alternately clamps to ground the outputs from potentiometers R1 and R2 on lines 50 and 52 respectively through transistors Q2 and Q3.

The pulse current control circuitry 26 comprises a pair of manually adjustable timing circuits 54 and 56 respectively, a flip-flop 58 and the transistors Q2 and Q3 respectively. The flip-flop 58 is made up of two Nand gates 60 and 62 respectively. A Nand gate is a "not And" circuit the operation of which is conventional and can be expressed by the following truth table where the first two columns represent the first and second inputs to the Nand gate:

| First | Second | Output |
|---|---|---|
| 0 | 0 | 1 |
| 0 | 1 | 1 |
| 1 | 0 | 1 |
| 1 | 1 | 0 |

It is obvious from the above truth table that the output is a logical zero only when both inputs are high, i.e., logical one's. Each Nand gate is connected one to the switching transistors Q2 and Q3 respectively. Hence, when the output of Nand gate 60 is high transistor Q3 is engergized clamping line 52 to ground potential and when the output of Nand gate 62 is high transistor Q2 is energized clamping line 50 to ground potential. It should be noted that the outputs of the Nand gates are interlocked as inputs to one another to form the flip-flop 58 such that Q2 and Q3 cannot under any circumstances be in the same state at the same time.

Flip-flop 58 is controlled by the timing circuits 54 and 56 respectively; which are identical to one another although they need not be. Power is applied to the timing circuits from the high output of flip-flop 58, i.e., when output 66 of Nand gate 60 is high power is applied to line 68 of timing circuit 54 and when output 64 of Nand gate 62 is high power is applied to line 70 of timing circuit 56. Once power is applied to one of the timing circuits, e.g., timing circuit 56, then capacitor C1 begins to charge with a time constant controlled by potentiometer R3. As soon as the voltage across capacitor C1, at point 72, respresenting the potential at the anode of PUT 1, reaches the voltage at point 74, representing the potential at the gate of PUT 1; PUT 1 fires and a pulse is generated on line 76. PUT 1 is a commercially available programable unijunction transistor having a controlled firing potential which is pre-set by setting a predetermined voltage at its gate terminal.

The pulse applied on line 76 is fed through a conventional inverter gate 78 to input line 80 of Nand gate 60. In the circuit arrangement as shown the generated pulse is a logical one which is inverted to a logical zero through the inverter gate 78. The output of the inverter gate 78 is normally high i.e. at logical one. With the input on line 80 now low the output 66 from Nand gate 60 must go high and simultaneously the output 64 from Nand gate 62 must go low. This is due to the interlocking relationship between the Nand gates 60 and 62 respectively. With the output 66 high, power is now applied, on line 68, to timing circuit 54 which times out capacitor C2 through potentiometer R4 in the same manner as was done in timing circuit 56. Obviously capacitor C2 need not be equal to capacitor C1 nor must potentiometer R4 be set similar to that of potentiometer R3. Hence, the elapsed time for turn-on and turn-off for transistors Q2 and Q3 can be set differently such that not only can the total pulse duration be varied but each half pulse period can be independently adjusted.

What is claimed is:

1. An arc working power supply adapted to be connected in circuit with an electrode and workpiece and including in combination a source of input power, a magnetic control element having a control winding, and a current control circuit for controlling the magnitude of current in said control winding, said current control circuit comprising:
   a source of alternating current;
   a full wave bridge rectifier network coupling said source of alternating current to said control winding, said rectifier network including gate means for controlling conduction of said network during each half cycle of alternating current;
   sensing means for providing an output DC feedback signal responsive to the DC level of current in said control winding;
   means for generating a reference signal which varies linearly between a first and second DC potential at a rate in synchronism with each half cycle of said alternating current;
   means for energizing said gate means when the difference between said reference signal and said feedback signal equals a predetermined value;
   means for generating a train of pulses asynchronous with respect to said alternating current and having a frequency of between 1–20 cps; and
   means for superimposing said train of pulses onto said reference signal such that the output working current of said power supply is a pulsating DC current having a period corresponding to the period of said train of pulses and a magnitude proportional to the magnitude of current in said control winding.

2. An arc working power supply as claimed in claim 1 wherein said means for generating a reference signal comprises, means for providing a first DC reference potential and a ramp signal generating means; and wherein said pulse generating means comprises, means for providing a second DC reference potential and means for alternately switching from said first DC reference potential to said second DC reference potential.

3. An arc working power supply as claimed in claim 2 wherein said switching means comprises: first and second timing means; a flip-flop circuit connected to said first and said second timing means such that said first timing means is energized only at the termination of said second timing means and vice versa; and means responsive to the output state of said flip-flop circuit for alternately inhibiting said first and DC output potentials.

4. An arc working power supply as defined in claim 3 wherein each of said first and second timing means comprises: a programmable unijunction transistor having an anode gate and cathode terminal and wherein said anode terminal is coupled through a manually adjustable potentiometer to an input of said flip-flop circuit and wherein a predetermined potential is connected to said gate terminal.

5. An arc working power supply as defined in claim 4 wherein said flip-flop circuit comprises two Nand gates each having two input terminals and one output terminal, with each output terminal being connected to the opposite Nand gate as one of the respective input terminals.

* * * * *